Sept. 2, 1930.    H. C. ROSE    1,774,615
GUARD FOR LINEMEN'S CLIMBING HOOKS
Filed Aug. 31, 1929
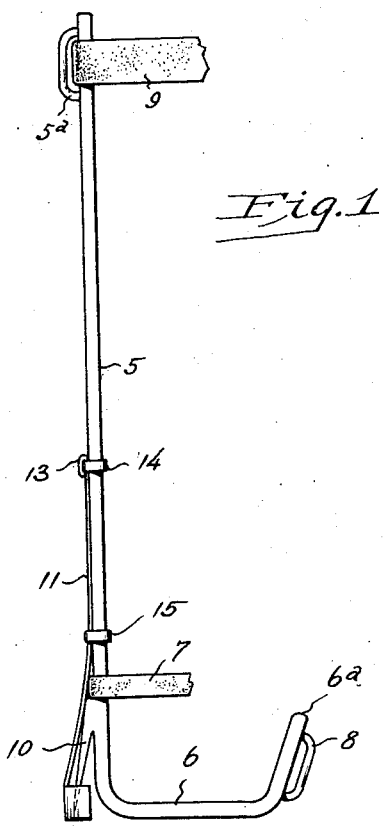
Fig.1.
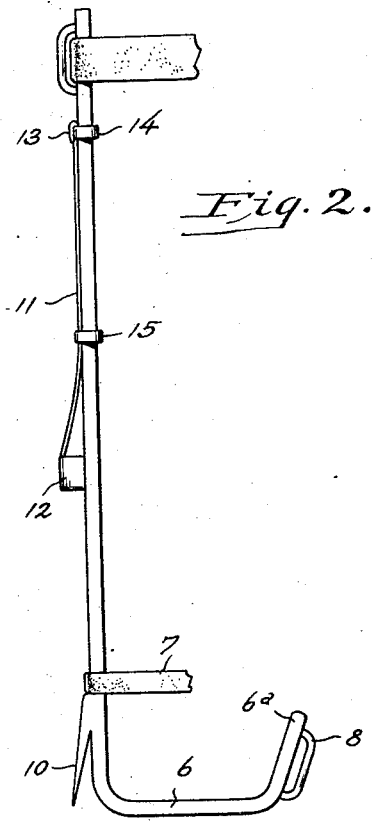
Fig.2.
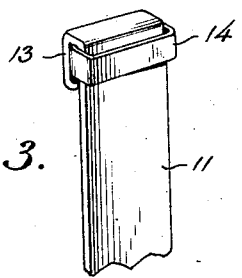
Fig.3.
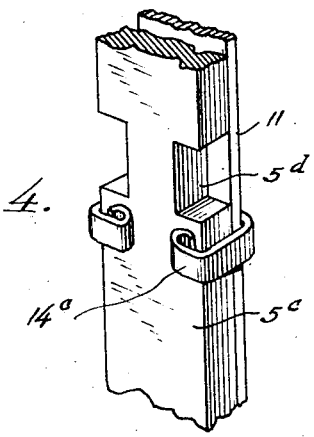
Fig.4.
HARRY C. ROSE
INVENTOR
BY Theodore L. White, Jr.
ATTORNEY
WITNESS: 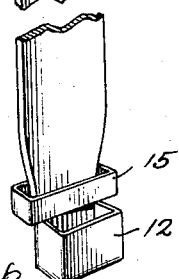

Patented Sept. 2, 1930

1,774,615

UNITED STATES PATENT OFFICE

HARRY C. ROSE, OF BROOKLYN, NEW YORK, ASSIGNOR OF ONE-THIRD TO THEODORE L. WHITE, JR., OF BROOKLYN, NEW YORK

GUARD FOR LINEMEN'S CLIMBING HOOKS

Application filed August 31, 1929. Serial No. 389,844.

This invention relates to improvements in guards for linemen's climbing hooks, and its leading object is to provide a guard which can be attached to any standard hook carrying shank or bar, and clamped over the piercing point of the pole engaging hook or prong to protect the user against the same, or shifted to an upper position and clamped on the shank so that the pole engaging hook or prong will be exposed for use in pole climbing or to support the lineman upon a pole.

Another object of the invention is the provision of a device for this general purpose which will be of simple construction to permit of economical manufacture, and easily attached and adjusted to any standard climbing device.

Other objects and advantages of the invention will be hereinafter specifically pointed out, or will become apparent, as the specification proceeds.

With the above indicated objects in view, the invention resides in certain novel construction and combination and arrangement of parts, clearly described in the following specification and fully illustrated in the accompanying drawings, which latter show an embodiment of the invention as at present preferred.

In the drawings:—

Figure 1 is a side elevation of the improved device, showing the guard in its guarding position over the climbing hook and the shank of the guard in clamped position on the shank of the climbing device.

Figure 2 is a similar view showing the guard in an elevated position clamped against the shank of the hook carrying bar, and the climbing hook exposed for climbing.

Figure 3 is a front perspective view of the device detached.

Figure 4 is a detail perspective view of a modified shank and connecting strip.

Referring to the accompanying drawings illustrating the practice construction of my invention 5 designates a shank of a standard climbing device, the lower end of which has the usual stirrup 6 upon which the user places the arched portion of his foot. A strap 7 extends from the shank to engage the eye 8 provided on the upstanding arm 6ª of the stirrup 6, so as to clamp the shank or bar 5 to the foot of the user. Another strap 9 is passed through the eye 5ª on the upper part of the shank 5, to tie the same to the leg of the user.

The downwardly and outwardly projecting pointed prong or hook 10, usually formed integral with the shank 5, projects at a relatively low angle so as to pierce the pole or tree which the lineman must climb to place, remove, or repair wires or their connections.

In climbing it is important that this hook be exposed, so that it will penetrate into the stock of the pole or tree to be climbed, without obstruction, and thus provide a dependable support for the climber, or lineman.

But when the lineman is not engaged in climbing the sharply pointed prong or hook will frequently expose the lineman to peril, and many accidents have resulted from the unguarded prongs or hooks.

My improved device embodies a shank 11, preferably of metal having a certain degree of resiliency, which is equipped with a point receiving cup or guard 12 on its lower end. The lower end of the shank is preferably grooved longitudinally, so that it will resist bending and snugly fit over the shank of the hook or prong 10, when the point of said hook or prong is enclosed by the cup or guard 12.

The upper end of the shank 11 is formed with an eye 13, by folding the metal upon itself, and in this eye the coupling strap or guide 14 is loosely secured, so that the strap will embrace both the shank 11 of the guarding device and the shank 5 of the climbing device at the same time. This strap is in the form of a closed oblong ring, and is preferably made of metal, so that it will retain its form without distortion, and can be readily pushed over the end of the shank 5.

The strap or guide may also be formed of rigid metal and C-shaped in cross section as at 14ª so that it will slide upon the shank 5ᶜ, which is provided with edge recess 5ᵈ, as shown in Figure 5, thus permitting easy assembling of the guard on the climbing device.

The shank 11 is clamped to the shank 5 by means of the sliding loop strap 15, also of metal, which is designed to slide upon the shank 11 and also to slidably engage the shank 5, by straddling both shanks.

In its original condition the shank 11 is flat, but when mounted upon the shank 5 of the climbing device, and the loop strap 15 moved upon both shanks to clamp the shank 11 of the guarding device to the shank of the climbing device, the latter shank will be sprung toward the former shank, thus maintaining the lower part of the shank 11 under tension against the prong or hook.

By shifting the sliding metal loop strap 15 upwardly upon both shanks this tension will be relieved, and the shank 11 may then be shifted downwardly on the shank 5, thus permitting the guarding cup 12 to clear the point of the hook or prong and be moved upwardly, to an inoperative or non-guarding position, above the climbing hook. The sliding loop strap may then be forced downwardly, the guard or cup 12 engaging the side of the shank 5, so that the shank 11 will be sprung against the shank 5 of the climbing device, and thus firmly clamped in its non-guarding position, thus permitting unrestricted use of said device for pole and tree climbing.

The user will be conscious of the two different positions of the guarding device by the location of the connecting metal loop straps against his leg, since the pressure against the leg will produce at the different points slightly differing nerve sensations, sufficient to inform the user of the two positions.

In Figure 5 a modified form of the shank of the climbing device is shown, wherein the shank 20 is provided with edge recesses 21 on the opposite sides thereof, which are designed to receive the C-shaped connecting straps.

I claim as new:—

1. The combination with a standard pole climbing device which includes a shank having a stirrup on one end and means for securing the stirrup and shank to the leg of the wearer, said device also having a downwardly diverging pole engaging climbing hook; of a point guarding device consisting of a resilient shank having a point receiving cup on one end thereof, a connection carried by the resilient shank and slidably engaging the shank of the climbing device, and means carried by the resilient shank for clamping said shank against the first shank, to support the latter shank against movement on the first, either in point guarding position or above this position, with the point unguarded for climbing purposes.

2. A prong guarding device for pole climbing devices, consisting of a resilient shank having a cup on one end thereof to receive the point of the climbing prong of a pole climbing device, a closed eye on the upper end of the shank, a metal loop strap connected with the eye and adapted to slidably engage the shank of a pole climbing device, and another metal strap slidably mounted on the resilient shank and adapted to slidably clamp said resilient shank against the shank of a pole climbing device.

In testimony whereof I hereby affix my signature.

HARRY C. ROSE.